United States Patent [19]

Yamamoto

[11] Patent Number: 5,759,477
[45] Date of Patent: Jun. 2, 1998

[54] METHOD OF MAKING FUSED FILM PLASTIC PARTS

[75] Inventor: Hiroaki Yamamoto, Brookville, Ohio

[73] Assignee: Green Tokai Co. Ltd., Brookville, Ohio

[21] Appl. No.: 763,710

[22] Filed: Dec. 13, 1996

[51] Int. Cl.$^6$ .................... B29C 45/16; B29C 51/10
[52] U.S. Cl. .................. 264/513; 264/510; 264/138; 264/266; 264/269
[58] Field of Search ................... 264/510, 511, 264/513, 138, 267, 266, 269

[56] References Cited

U.S. PATENT DOCUMENTS

| | | | |
|---|---|---|---|
| 3,154,617 | 10/1964 | Schenk et al. | 264/266 |
| 3,289,253 | 12/1966 | Buonaiuto | 18/47 |
| 3,290,082 | 12/1966 | Fritsch | 293/1 |
| 3,359,030 | 12/1967 | Newman | 293/1 |
| 3,388,523 | 6/1968 | Evans | 52/717 |
| 3,444,275 | 5/1969 | Willett | 264/26 |
| 3,451,709 | 6/1969 | Swauger | 293/1 |
| 3,493,257 | 2/1970 | Fitzgerald et al. | 293/71 |
| 3,506,294 | 4/1970 | Newman | 293/1 |
| 3,715,138 | 2/1973 | Finkle | 293/1 |
| 3,843,475 | 10/1974 | Kent | 161/4 |
| 3,897,967 | 8/1975 | Barenyi | 293/1 |
| 3,914,482 | 10/1975 | Sawa et al. | 428/31 |
| 3,959,538 | 5/1976 | Loew | 428/31 |
| 4,015,760 | 4/1977 | Bett | 224/42.1 D |
| 4,060,577 | 11/1977 | Collins | 264/45.4 |
| 4,066,285 | 1/1978 | Hall et al. | 293/62 |
| 4,076,790 | 2/1978 | Lind | 264/266 |
| 4,083,592 | 4/1978 | Rubin et al. | 293/71 R |
| 4,142,370 | 3/1979 | Giordano | 405/119 |
| 4,154,893 | 5/1979 | Goldman | 428/375 |
| 4,160,052 | 7/1979 | Krysiak et al. | 428/31 |
| 4,174,986 | 11/1979 | Jennings | 156/160 |
| 4,197,688 | 4/1980 | Mauer | 52/718 |
| 4,216,184 | 8/1980 | Thomas | 264/229 |
| 4,230,659 | 10/1980 | Sutch | 264/266 |

(List continued on next page.)

OTHER PUBLICATIONS

Brilliant Performance, Rexham Branded Products, Publication No. ACI1352, Oct. 1987.
SAE Technical Paper Series #902231, Paint Film Laminate Technology Provides Painted Thermoplastic Parts Without VOC Issues, Charles H. Fridley, Avery Automotive Division, Truck and Bus Meeting & Exposition, Detroit, Michigan, Oct. 29–Nov. 1, 1990.
Avloy® Paint Fil Laminate.
In–Mold Foil, Avery Dennison Automotive Division.
Avloy® Converting Process, Avery Dennison Automotive Division.
Avloy® Production Process.
OEM Approval, Avery Dennison Automotive Division.
Avloy® Formable Finish, Avery Dennison Automotive Division.
Florida Exposure, Avery Dennison Automotive Division.
Chemical Resistance, Avery Dennison Automotive Division.
Graphicolor™ Vinyl Siding Process.

*Primary Examiner*—Jan H. Silbaugh
*Assistant Examiner*—Edmund H. Lee
*Attorney, Agent, or Firm*—Biebel & French

[57] ABSTRACT

Improved methods of superposing a film laminate over a plastic substrate and fused film-plastic parts made thereby. Improvement in traditional techniques is provided by preforming the film laminate proportionately relative to the size and shape of the underlying plastic substrate whereby improved gloss consistency of the fused film-plastic part is observed. The film laminate is preformed by shaping it over a pattern block wherein the film laminate is provided with an inner height and inner face width. The inner height of the film laminate is less than the height of the plastic substrate while the inner face width of the film laminate is greater than the face width of the plastic substrate. The film laminate is next positioned in a mold cavity wherein a molten resin is injected thereby forming the plastic substrate and fusing the film laminate thereover.

13 Claims, 2 Drawing Sheets

U.S. PATENT DOCUMENTS

| | | | |
|---|---|---|---|
| 4,293,520 | 10/1981 | Akutsu | 264/513 |
| 4,298,324 | 11/1981 | Soulier | 425/174.8 E |
| 4,334,700 | 6/1982 | Adell | 280/770 |
| 4,334,706 | 6/1982 | Seki | 293/126 |
| 4,358,482 | 11/1982 | Jubelt | 427/259 |
| 4,364,789 | 12/1982 | Moran | 156/214 |
| 4,408,432 | 10/1983 | Carter et al. | 52/718 |
| 4,414,731 | 11/1983 | Riemer | 29/453 |
| 4,416,843 | 11/1983 | Helms | 264/152 |
| 4,420,447 | 12/1983 | Nakashima | 264/46.4 |
| 4,489,019 | 12/1984 | Takeda et al. | 264/26 |
| 4,537,739 | 8/1985 | Ruhl | 264/247 |
| 4,546,021 | 10/1985 | Mears | 428/31 |
| 4,579,755 | 4/1986 | Takeda et al. | 428/31 |
| 4,587,761 | 5/1986 | Adell | 49/462 |
| 4,587,762 | 5/1986 | Adell | 49/462 |
| 4,597,755 | 7/1986 | Samson et al. | 604/96 |
| 4,613,178 | 9/1986 | Fujita | 293/128 |
| 4,617,209 | 10/1986 | Ives | 428/31 |
| 4,619,847 | 10/1986 | Jackson | 428/31 |
| 4,643,789 | 2/1987 | Parker et al. | 156/219 |
| 4,671,974 | 6/1987 | Murachi | 428/31 |
| 4,710,338 | 12/1987 | Bagnall et al. | 264/509 |
| 4,715,648 | 12/1987 | Hensel | 296/198 |
| 4,719,067 | 1/1988 | Thiel | 264/259 |
| 4,721,642 | 1/1988 | Yoshimi et al. | 428/90 |
| 4,722,818 | 2/1988 | Zoller | 264/171 |
| 4,724,585 | 2/1988 | Whitman | 24/295 |
| 4,726,614 | 2/1988 | Myers et al. | 293/128 |
| 4,734,147 | 3/1988 | Moore | 156/212 |
| 4,767,040 | 8/1988 | Miller et al. | 224/326 |
| 4,778,550 | 10/1988 | Barton et al. | 156/211 |
| 4,786,094 | 11/1988 | Barton et al. | 293/128 |
| 4,797,244 | 1/1989 | Sauer | 264/266 |
| 4,808,450 | 2/1989 | Guy | 428/31 |
| 4,906,421 | 3/1990 | Plamthottam et al. | 264/22 |
| 4,940,557 | 7/1990 | Kimura | 264/26 |
| 5,000,902 | 3/1991 | Adams | 264/510 |
| 5,023,033 | 6/1991 | Cakmakei | 264/161 |
| 5,063,014 | 11/1991 | Cakmakei | 264/151 |
| 5,087,488 | 2/1992 | Cakmakei | 428/31 |
| 5,096,652 | 3/1992 | Uchiyama et al. | 264/511 |
| 5,100,728 | 3/1992 | Plamthottam et al. | 428/345 |
| 5,108,681 | 4/1992 | Cakmakei | 264/151 |
| 5,178,708 | 1/1993 | Hara et al. | 156/242 |
| 5,194,194 | 3/1993 | Kato et al. | 264/513 |
| 5,203,941 | 4/1993 | Spain et al. | 156/209 |
| 5,227,108 | 7/1993 | Reid, Jr. et al. | 264/148 |
| 5,240,751 | 8/1993 | Cakmakei | 428/31 |
| 5,242,650 | 9/1993 | Rackovan et al. | 264/509 |
| 5,264,172 | 11/1993 | Rodsica et al. | 264/132 |
| 5,326,520 | 7/1994 | Franck et al. | 264/325 |
| 5,336,460 | 8/1994 | Hettinga | 264/251 |
| 5,368,798 | 11/1994 | Mizukoshi et al. | 264/154 |
| 5,401,457 | 3/1995 | Valyi | 264/511 |
| 5,456,307 | 10/1995 | Mouri | 164/446 |
| 5,456,957 | 10/1995 | Jackson et al. | 428/31 |
| 5,599,608 | 2/1997 | Yamamoto et al. | 264/510 |

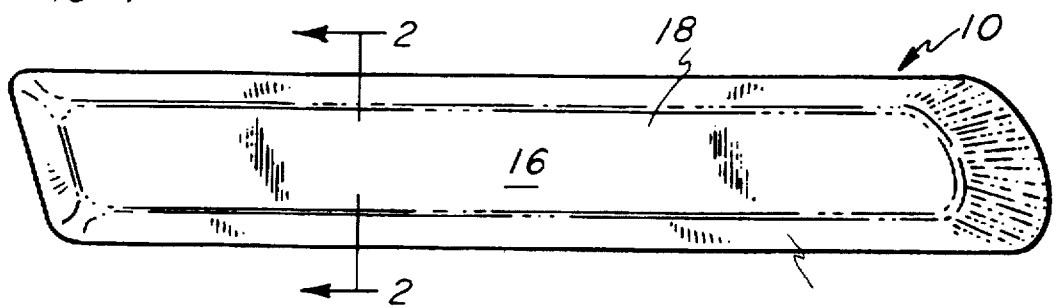
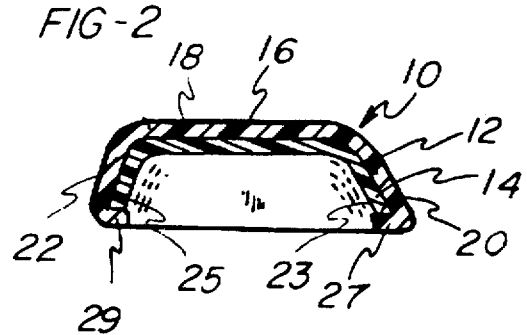
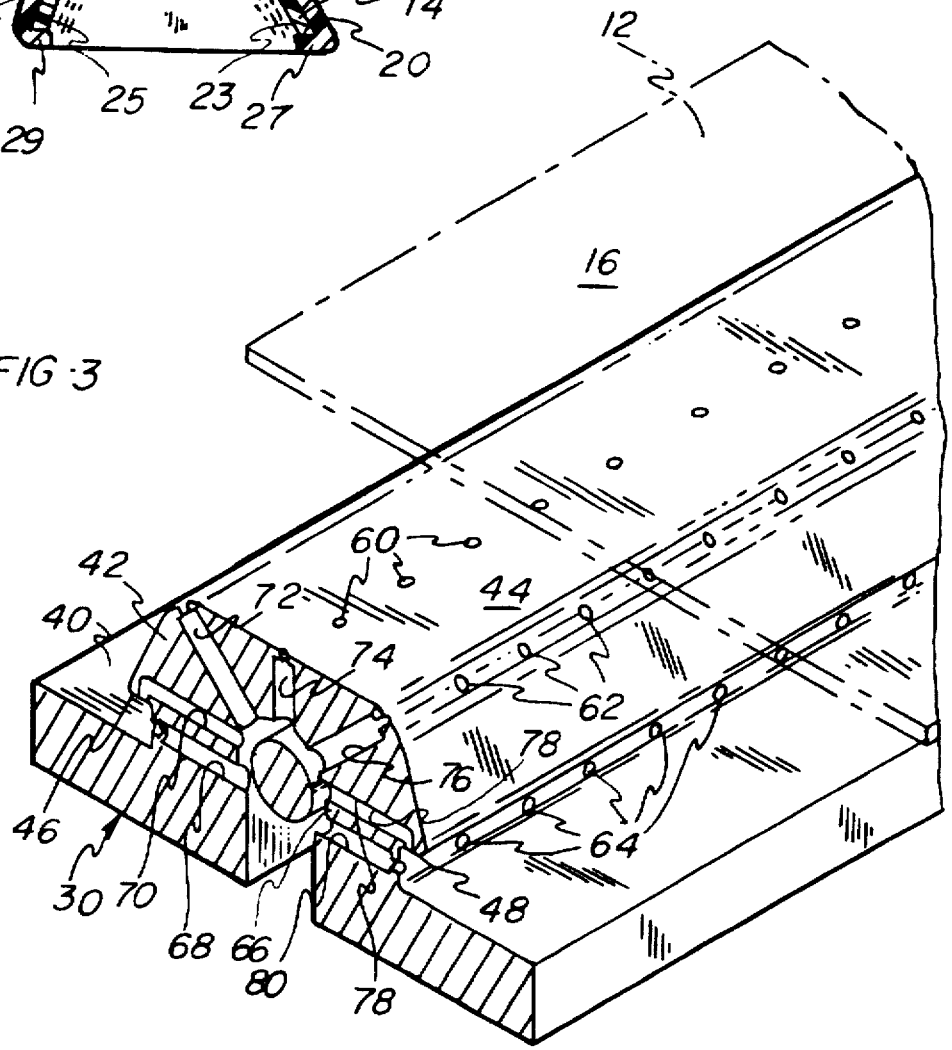

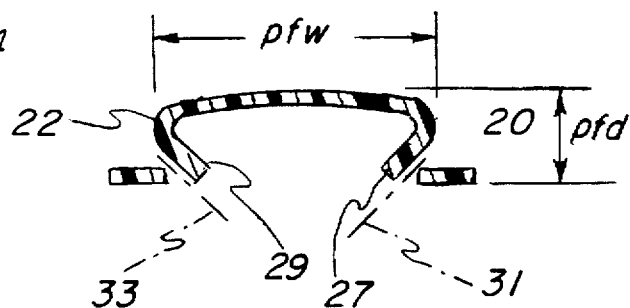
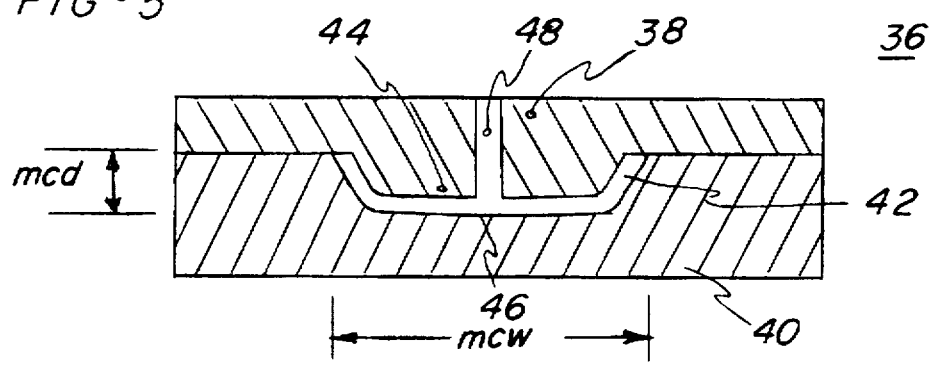
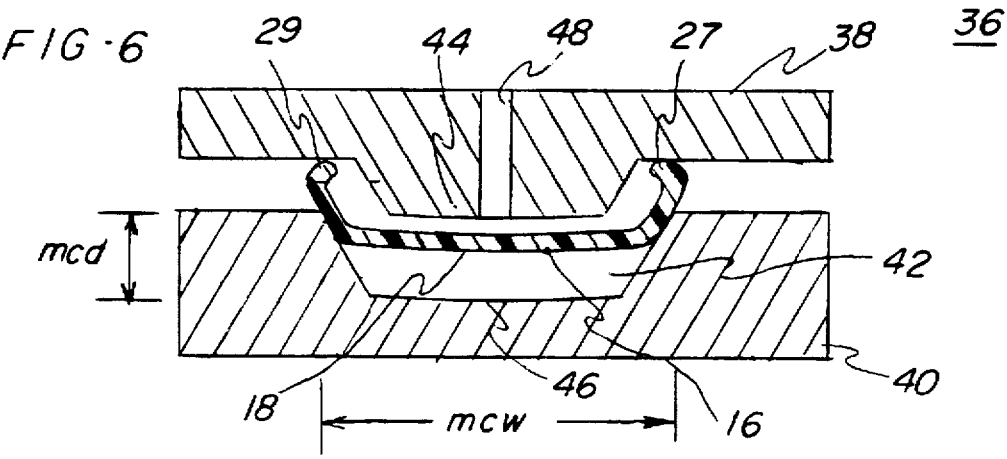
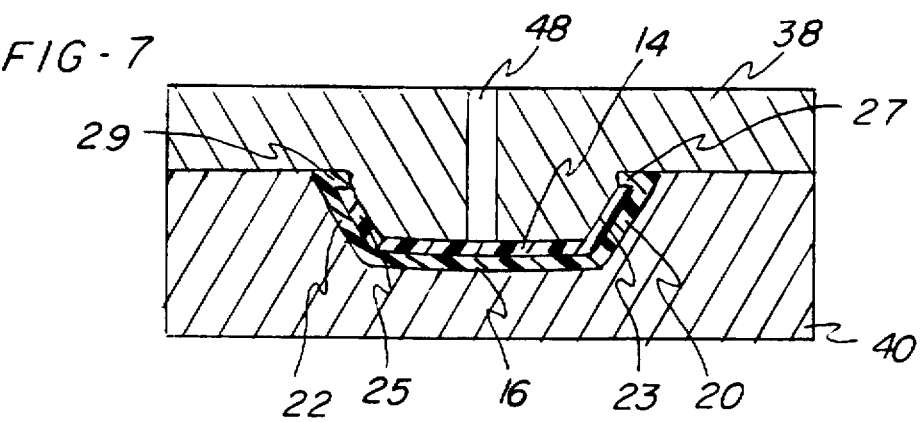

METHOD OF MAKING FUSED FILM PLASTIC PARTS

BACKGROUND OF THE INVENTION

1. Field of the Invention

The present invention pertains to improved methods of making fused film-plastic parts and to film-plastic parts made in accordance with such improved methods.

2. Description of the Prior Art

A variety of injection molded parts are made and used for automobile body and trim parts. For example, bumpers, body panels, doors, filler panels, wheel covers, dashboards, arm rests and other parts are commonly made using injection molding techniques. Furthermore, automobile exteriors, body side moldings, beltline moldings, roof moldings and window moldings are typically made by the injection molding of polyvinyl chloride (PVC) or other thermoplastic materials.

In order to provide a painted surface for these parts, film lamination techniques are commonly employed. A paint film laminate is insert molded with the desired thermoplastic to fuse the film over the injection molded substrate. The resulting injection molded film-plastic part is ready for assembly without subsequent painting.

The paint film laminate used in these insert molding techniques may comprise a backing sheet of about 0.020" in thickness to which paint layers are adhered. Typically, the backing sheet comprises an extruded thermoplastic sheet.

In such paint film laminates, a paint film, comprising a cast dried continuous paint coating, is provided over the backing sheet. The paint film may consist of a monocoat, a clear coat over a base coat or a clear coat and a base coat with interposed print or design. The paint film, including base coat, clear coat and print or design, if desired, may range from about 0.5–4 mil. in thickness.

Laminated paint films are well known in the art and are available, for example, from Avery Dennison, Automotive Division, or Rexham Decorative Products, Charlotte, N.C. The films are typically provided in a roll, unwound and then "preformed" to closely mirror a size and shape approximating that of the final injection molded film-plastic part. The preforming process often comprises compressing and heating the film within a mold cavity to impart the desired basic shape to the film.

Preforming may also be accomplished by heating the film and then shaping it over a pattern block which corresponds to the size and shape of the injection molded plastic substrate. A vacuum may be drawn from a plenum communicating with air channel means in the pattern block to draw the paint film over the pattern block and conform it to the desired shape.

The preform is next usually trimmed to a proper size and placed along the cavity side of an injection mold with the painted side thereof facing the mold cavity surface. In some instances, the preform may be placed along the core side of the mold. The mold is then clamped and the desired molten resin is injected into the mold cavity. Heat and pressure conditions in the mold partially melt the backing sheet and a melt bonding or fusion of the injected resin and film occur. Injection molds used for these processes are rear or edge gated so that the molten resin is directed along the backside of the film.

Techniques for preforming paint film laminates and insert molding film-plastic parts are disclosed in U.S. patent application Ser. No. 08/372,230 to Yamamoto, filed Jan. 13, 1995, U.S. patent application Ser. No. 08/393,169 to Yamamoto, filed Feb. 21, 1995, and U.S. patent application Ser. No. 08/506,362 to Yamamoto, filed Jul. 24, 1995, now U.S. Pat. No. 5,599,608. The disclosure of these applications is incorporated herein by reference.

Although the prior art film lamination techniques provide significant advantage, they are not without problem. One significant problem encountered is a lack of gloss consistency on the surface of the film laminate after it is fused to the plastic part. Often times, a much higher gloss exists on a top face surface compared to longitudinal edge surfaces of the film laminate as it is superposed over the plastic substrate. In these cases, the high gloss top face surface is usually classified as an "A" type show surface while the reduced gloss edge surfaces are typically considered lower quality "B" type show surfaces. Accordingly, resulting film-plastic parts are often rejected as having an aesthetically displeasing appearance since the continuity of the gloss is interrupted and "B" type show surfaces are visible along the edge surfaces of the plastic part. Additionally it has been difficult to achieve a complete covering or wrapping of the paint film along the entire surface area defined by the longitudinal edge portion of the part.

Accordingly, there remains a need in the art to improve upon the existing methods of forming a fused film-plastic part exhibiting consistent gloss properties and to help ensure wrapping or coverage of the paint film over the longitudinal edge portion of the part.

SUMMARY OF THE INVENTION

The method includes preforming a film laminate to generally conform to the shape of the plastic substrate over which the film laminate is to be superposed. The preformed film laminate is shaped such that it has a film face width that is greater than the width of the mold cavity into which the film laminate will be placed for co-injection molding, over the desired substrate. The height of the preform is less than the height or depth of the mold cavity. During the co-molding process, the preformed film laminate is stretched to conform to mold cavity shape.

It has been discovered that this method of preforming the film laminate in proportion to the dimensions of the mold cavity in which the injection co-molding process takes place results in improved gloss consistency of the resulting film-plastic part. The gloss properties on the longitudinal edge portions are substantially uniform to the gloss properties on the face surface of the plastic part, resulting in a more consistent "A" type show surface. Additionally, improvement in the wrapping or covering of the longitudinal edges or sides of the substrate by the paint film have been noted.

The invention will be further described in conjunction with the following detailed description, the accompanying drawings and the appended claims.

BRIEF DESCRIPTION OF THE DRAWINGS

FIG. 1 is a plan view of a film-plastic part made in accordance with the invention;

FIG. 2 is a sectional view of the film-plastic part of FIG. 1 taken along line 2—2;

FIG. 3 is a perspective view of a pattern block and overlying paint film laminate, showing the preferred method for preforming the paint film laminate into the desired shape;

FIG. 4 is a transverse sectional view of a preformed paint film laminate in accordance with the invention;

FIG. 5 is a cross sectional view of an injection mold cavity of the type typically used to injection co-mold the paint film laminate over the desired plastic substrate.

FIG. 6 is a cross sectional view showing initial placement of the preformed paint film in accordance with the invention in the injection mold cavity shown in FIG. 5; and FIG. 7 is a cross sectional view of the mold cavity of FIG. 6 after completion of the injection co-molding process and prior to removal of the co-molded substrate and paint film combination therefrom.

DETAILED DESCRIPTION OF THE PREFERRED EMBODIMENT

Referring initially to FIGS. 1 and 2 of the drawings, there is shown a fused film-plastic part or body side molding 10 made in accordance with the invention.

Body side molding 10 comprises a paint film laminate 12 fused to an elongated plastic substrate 14. The paint film laminate 12 has an outer, show surface 16 having a face portion 18 and edge portions 20, 22 which extend longitudinally along and over the longitudinally extending sides of the elongated plastic substrate. The face portion 18 has a high gloss and is therefore usually categorized as an "A" type show surface.

One aspect of the present invention is directed toward methods and structures for providing consistent gloss properties throughout the outer surface 16 of the paint film laminate 12 resulting in a substantially uniform "A" type show surface along both face portion 18 and edge portions 20, 22. Stated differently, the gloss exhibited by the paint film laminate 12 along the face portion 18 is substantially the same as that gloss shown along the longitudinal edge portions 20, 22. All of the these surfaces (i.e., 18, 20, 22) are classified as Type "A" show parts. Additionally, the instant processes help to ensure complete coverage of edge portions 20, 22 over the respective longitudinally extending sides of the plastic substrate. More specifically, bottom longitudinally extending side edges 23, 25 of the substrate are covered completely by inwardly extending dog legs or flaps 27, 29 of the paint film.

Turning now to FIG. 3, there is shown a pattern block assembly which is preferably used to impart the desired shape and dimensions to the paint film laminate in the preforming process. The pattern block 30 consists of a body 40 defining one or more elongated parallel forms 42 (only one shown in FIG. 3). As shown in FIG. 3, the form 42 has an upper surface 44 bounded at either longitudinal end by two re-entrant grooves 46, 48. The upper surface 44 defines a contour roughly corresponding to the outer contour of the finished body side molding 10 (FIGS. 1 and 2).

The form 42 includes several lines of vacuum ports 60, 62, 64 (only three lines shown in FIG. 3) extending longitudinally along the upper surface 44 and re-entrant grooves 46, 48 of the form 42. These lines of vacuum ports 60, 62, 64 communicate with a plenum 66 by means of conduits 68, 70, 72, 74, 76, 78, 80. The plenum 66, in turn, communicates with a conventional vacuum source (not shown) to provide suction through the vacuum ports 60, 62, 64.

The unformed film 12 is shaped by bending it over the form 42. The unformed film 12 is typically provided in a roll (not shown). It is unwound, trimmed if necessary to a proper size, and then heated until it is easily deformable. The heated film 12 is then laid over the form 42 with its outer paint or pigment containing surface 16 facing away from the pattern block 30 and pulled against the upper surface 44 and into the re-entrant groove 46, 48 of the form 42 by the suction through the vacuum ports 60, 62, 64. As it cools, the film 12 hardens over the form 42 so that the hardened shaped film (FIG. 4) conforms to the contour of the upper surface 44 and the re-entrant groove 46, 48 of the form 42. The upper surface 44 of the form defines the convex contour of the face portion 18 of the film laminate 12 while the re-entrant grooves 46, 48 of the form 42 define inwardly-curving portions of the shaped film 12 which after the co-molding step are the inwardly extending dog legs 27, 29 shown in FIG. 2.

Turning now to FIG. 4, there is shown a cross sectional view of the paint film laminate after it has been preformed, preferably on the pattern block assembly to the type shown in FIG. 3. It is to be remembered that other apparatus and methods can be used to form the preform provided that the preform is configured as shall be set forth hereinbelow.

The preformed film laminate of FIG. 4 has an outer surface 16 and edge portions 20, 22. Inwardly (or reentrant) extending dog legs or flaps 27, 29, are continuous with the edges 20, 22 and are adapted to completely cover the bottom sides 23, 25 of the corresponding edges of the plastic substrate. (See FIG. 2.) Dot dash lines 31, 33 are provided to illustrate the approximate location in which the preformed film laminate is trimmed prior to its insertion into the injection mold.

The height (or depth) of the preform film laminate (pfd) as imparted by the preforming process, such as the pattern block and vacuum formation steps stated above, is such that it is less than the height (or depth) of the mold cavity (mcd) into which the preformed film will be placed for the injection co-molding process. The width of the preformed film (pfw) is however greater than the width of the mold cavity (mcw) into which the preformed film will be placed for subsequent co-molding over the desired substrate.

After the film 12 has been preformed, it is inserted into a mold 36 of an injection molding machine such as that shown in FIG. 5. The mold 36 includes a male mold member 38 and corresponding female cavity mold member 40 adapted to mate and define a mold cavity 42 therebetween. The mold cavity 42 is interposed between a male core 44 and a cavity surface 46 of the female cavity mold member 40. The cavity surface 46 defines a cavity depth and width, identified as "mcd" and "mcw" respectively in FIG. 5. As shown, the mcw is the linear distance between the longitudinally extending boundary edges of the mold cavity 42.

Turning now to FIG. 6, the preformed film laminate is placed in the mold cavity 42 with its painted show side 16 facing the cavity surface 46. Since the width of the preformed film laminate pfw is greater than the width of the mold cavity mcw, the face portion 18 of the film laminate tends to bulge toward the cavity surface 46. Due to this over dimensioning of the pfw relative to the mcw and the resilient nature of the paint film laminate, the preformed film laminate is frictionally and snugly received within the mold cavity. This friction fit is important in helping to ensure reliable, secure placement of the laminate in the mold. Oftentimes, these molds are vertically oriented and gravity causes the preformed film laminate to slip and slide downwardly along the mold cavity out of proper mold cavity alignment.

At the same time the vector forces acting on the paint film as it is compressed within the smaller mcw of the mold cavity during the injection molding process are such as to torque or rotate the flaps 27, 29 inwardly (towards each other). This helps to ensure that the flaps 27, 29 will cover the bottom edges of the substrate with paint film during the molding process as can be seen in FIG. 7.

Turning back to FIG. 6, a gate 48 is provided thru the core 44 and serves as an inlet for pressurized flow of molten resin, for example a thermoplastic or thermoset resin such as polypropylene or PVC, therethrough so as to fill the mold cavity 42, thereby forcing the film 12 up against the cavity surface 46 and forming the plastic substrate 14. The paint film laminate 12 is fused to the substrate 14 wherein a single film-plastic part or body side molding 10 is formed.

Preferably, pfw is made to be about 20–30% wider than mcw. The surface area however along any given length of the preformed paint film is substantially the same as the surface area along the same length of the face of the mold. From another point of view, the pfd is made to be about 20–30% less than the dimension mcd with the surface area of the film being substantially equal to the surface area of the mold concavity along any given finite length of the film and mold cavity.

Although applicant is not to be bound to any particular theory of operation it is thought that provision of a pfw that is greater than the mcw means that the paint film is stretched less in the widthwise direction as it is co-molded with underlying plastic to conform to the shape of the surface 46 than in prior art methods wherein the pfw is approximately equal to mcw. Accordingly, the paint pigments disposed in the paint coating layer of the paint film laminate are not dispersed to the extent they would be in the prior art methods. This means that the relative number of pigments per unit width of the pfw remains substantially the same in the areas 18 on one hand and edge areas 20, 22 of the paint film covered substrate. This results in a uniform gloss existing between the face 18 and the longitudinal edges 20, 22.

Having described the invention in detail and by reference to preferred embodiments thereof, it will be apparent that modifications and variations are possible without departing from the scope of the invention defined in the appended claims.

What is claimed is:

1. An method of making a plastic part by insert molding a film laminate over a plastic substrate, said method comprising:
   providing a mold including a mold cavity defined by a male mold member including a core portion thereof and a female mold member having a concavity therein, said concavity having a concavity width and a concavity depth, said concavity width and said concavity depth, together, defining a cavity surface;
   preforming a film laminate to provide said film laminate with opposed re-entrant flaps and an outer film face width that is greater than said concavity width and a depth that is less than said concavity depth;
   positioning said film laminate in said concavity so that said film laminate is frictionally fit within said concavity at a depth which is less than said concavity depth;
   closing said mold to position said film laminate including said opposed re-entrant flaps within said mold cavity; and
   injecting a prepolymer into said mold cavity to form a plastic substrate whereby said film laminate is deformed in said mold to conform to said cavity surface in superposition to said plastic substrate.

2. The method as recited in claim 1 wherein the step of preforming the film laminate includes providing a pattern block having a block face width and shaping said film laminate over said pattern block, wherein said block face width is congruent with said outer film face width.

3. The method as recited in claim 2 wherein the step of preforming the film laminate further comprises heating said film laminate until deformable prior to shaping said film laminate over said pattern block.

4. The method as recited in claim 2 wherein the step of preforming said film laminate further comprises cooling said film laminate to form a hardened shaped film that conforms to the contour of the pattern block subsequent to said shaping.

5. The method as recited in claim 2 wherein the step of shaping said film laminate includes placing said film laminate over said pattern block and pulling said film laminate against said pattern block by a vacuum.

6. The method as recited in claim 5 further comprising forming a plurality of apertures in said pattern block wherein the step of pulling said film laminate against said pattern block includes applying suction against said film laminate through said apertures.

7. The method as recited in claim 1 further comprising the step of cutting the film after said preforming.

8. A method for improving gloss consistency of a paint film laminate that is injection co-molded over a plastic substrate to form a paint film covered plastic substrate useable as an automobile molding or trim member comprising:
   providing a mold including a mold cavity defined by a male mold member including a core portion thereof and a female mold member having a concavity therein, said concavity having a width-wise dimension congruent to a width-wise face dimension of said paint film covered plastic substrate; said concavity also including a concavity depth, said width-wise dimension and said concavity depth, together, defining a cavity surface;
   preforming said paint film laminate to have opposed re-entrant flaps and a width-wise dimension that is larger than said width-wise face dimension of said mold cavity and a depth dimension that is shallower than said concavity depth;
   positioning said paint film laminate in said concavity so that said width-wise dimension of said paint film laminate is frictionally fit within said concavity at a depth which is less than said concavity depth;
   closing said mold to position said paint film laminate including said opposed re-entrant flaps within said mold cavity; and
   injecting a molten plastic material into said mold cavity whereby said paint film laminate is deformed in said mold to conform to said cavity surface and cover said plastic substrate.

9. The method as recited in claim 8 wherein said preforming said paint film laminate includes providing a pattern block having a face width corresponding to said width-wise dimension of said paint film laminate and deforming said film laminate over said pattern block.

10. The method as recited in claim 9 wherein said preforming comprises heating said paint film laminate until deformable prior to deforming said film laminate over said pattern block.

11. The method as recited in claim 10 wherein the step of preforming said paint film laminate further comprises cooling said paint film laminate to form a hardened shaped film that conforms to the contour of the pattern block subsequent to deforming.

12. The method as recited in claim 11 wherein the step of deforming said paint film laminate includes placing said paint film laminate over said pattern block and pulling said paint film laminate against said pattern block by a vacuum.

13. The method as recited in claim 12 further comprising forming a plurality of apertures in said pattern block wherein the step of pulling said paint film laminate against said pattern block includes applying suction against said paint film laminate through said apertures.

* * * * *